United States Patent
Hua et al.

(10) Patent No.: US 10,639,613 B2
(45) Date of Patent: May 5, 2020

(54) LIGAND-CONTAINING CONJUGATED MICROPOROUS POLYMER AND USE THEREOF

(71) Applicant: SOOCHOW UNIVERSITY, Suzhou (CN)

(72) Inventors: Daoben Hua, Suzhou (CN); Meiyun Xu, Suzhou (CN); Xiaoli Han, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 55 days.

(21) Appl. No.: 16/059,007

(22) Filed: Aug. 8, 2018

(65) Prior Publication Data

US 2019/0030513 A1 Jan. 31, 2019

Related U.S. Application Data

(63) Continuation-in-part of application No. PCT/CN2017/099378, filed on Aug. 29, 2017.

(30) Foreign Application Priority Data

Jul. 27, 2017 (CN) .......................... 2017 1 0621505

(51) Int. Cl.
  *B01J 20/26* (2006.01)
  *C08G 61/12* (2006.01)
  (Continued)

(52) U.S. Cl.
  CPC ......... *B01J 20/265* (2013.01); *B01J 20/3085* (2013.01); *C08G 61/02* (2013.01);
  (Continued)

(58) Field of Classification Search
  CPC ...................................................... B01J 20/265
  See application file for complete search history.

(56) References Cited

U.S. PATENT DOCUMENTS 3,146,213 A * 8/1964 Small .................... C22B 60/026
  521/33
4,220,726 A * 9/1980 Warshawsky ...... B01J 20/28097
  210/679

FOREIGN PATENT DOCUMENTS

| CN | 104525161 A | 4/2015 |
| CN | 105688844 A | 6/2016 |
| CN | 106864124 A | 6/2017 |

OTHER PUBLICATIONS

Chandra et al. Journal of Polymer Science Part a Polymer Chemistry, vol. 27, 3237-3250 (Year: 1989).*

(Continued)

*Primary Examiner* — Mark S Kaucher
(74) *Attorney, Agent, or Firm* — SZDC Law P.C.

(57) ABSTRACT

The present invention relates to a ligand-containing conjugated microporous polymer, which is obtained by covalent coupling of a conjugated microporous polymer and a uranium complexing ligand. The conjugated microporous polymer comprises an aromatic ring and/or a heterocyclic ring. The uranium complexing ligand is selected from the group consisting of a compound with a group containing phosphorus, a compound with a group containing nitrogen, and a compound with a group containing sulfur. The invention further provides use of the ligand-containing conjugated microporous polymer as a uranium adsorbent. The ligand-containing conjugated microporous polymer the invention is capable of adsorbing the radioactive element uranium in strongly acidic and strong-radiation environments.

11 Claims, 3 Drawing Sheets

(A)

(B)

(51) Int. Cl.
    *C08G 61/02*     (2006.01)
    *B01J 20/30*     (2006.01)
    *C08G 83/00*     (2006.01)
    *G21F 9/12*     (2006.01)
    *C08J 9/28*     (2006.01)

(52) U.S. Cl.
    CPC ......... *C08G 61/124* (2013.01); *C08G 83/008* (2013.01); *G21F 9/12* (2013.01); *C08G 2261/12* (2013.01); *C08G 2261/132* (2013.01); *C08G 2261/147* (2013.01); *C08G 2261/1432* (2013.01); *C08G 2261/152* (2013.01); *C08G 2261/18* (2013.01); *C08G 2261/312* (2013.01); *C08G 2261/3142* (2013.01); *C08G 2261/3328* (2013.01); *C08G 2261/3422* (2013.01); *C08G 2261/37* (2013.01); *C08J 9/28* (2013.01); *C08J 2205/044* (2013.01); *C08J 2300/10* (2013.01); *C08J 2365/00* (2013.01)

(56) References Cited

OTHER PUBLICATIONS

Yi Peng et al., Synthesis and Application of Conjugated Microporous Polymers and Their Composite Materials, Chemistry (Huaxue Tongbao), 2016, vol. 79, No. 8, pp. 699-713.
Baiyan Li et al., Functionalized Porous Aromatic Framework for Efficient Uranium Adsorption from Aqueous Solutions, ACS Appl. Mater. Interfaces 2017, 9, 12511-12517.
Xiaoli Han et al., Acetylcysteine-functionalized microporous conjugated polymers for potential separation of uranium from radioactive effluents, J. Mater. Chem. A, 2017, 5, 5123-5128.

\* cited by examiner

LIGAND-CONTAINING CONJUGATED MICROPOROUS POLYMER AND USE THEREOF

This application is the continuation-in-part application of PCT/CN2017/099378, filed on Aug. 29, 2017, which claims priority to Chinese Patent Application No.: 201710621505.3, filed on Jul. 27, 2017, which is incorporated by reference for all purposes as if fully set forth herein.

FIELD OF THE INVENTION

The present invention relates to the technical field of environmental protection, and more particularly to a ligand-containing conjugated microporous polymer and use thereof.

DESCRIPTION OF THE RELATED ART

Uranium is an important raw material for nuclear power generation. Spent fuel contains a high concentration of uranium. Recycling uranium from highly radioactive waste for reuse is an important guarantee for the sustainable development of nuclear energy. However, the high acidity and strong radiation are the main difficulties and challenges in extracting uranium from spent fuel.

At present, the method for post-treatment of spent fuel mainly includes liquid-liquid extraction, including the Purex process in which a mixed extracting agent of CMPO and TBP is used, and the CTH process in which a mixed extracting agent of HDEHP and TBP is used. However, the liquid-liquid extraction has the disadvantages such as too many operation procedures, production of a large amount of organic solvent waste liquid during the treatment process, and secondary pollution caused by the degradation of the extracting agent. Moreover, the solid-phase adsorption has attracted more and more attention because of the simple operation, the recyclability of the adsorbent, and other advantages. In most of the solid adsorbents, a functionalized ligand is attached to a backbone material. However, many solid adsorbents suffer from a series of degraded or even lost performances when exposed to high doses of radiation. Although some inorganic materials can tolerate strong radiation, efficient adsorption and separation of uranium under strongly acidic conditions cannot be achieved for them.

Conjugated microporous polymers are a class of microporous organic polymer materials constructed with a fully conjugated molecular chain and having a three-dimensional network structure. Due to the advantages such as large specific surface area and designability of the structures, the conjugated microporous polymer is suitable to be used as an adsorbent. Also, the conjugation property imparts a high radiation resistance to the material. It has been reported in literatures that a conjugated microporous polymer functionalized with acetylcysteine is used for uranium adsorption, in which the adsorption capacity for uranium is as high as 165 mg/g, and an excellent selectivity for uranium is exhibited. However, the adsorption for uranium can only be achieved for the material under a weakly acidic condition, when the pH is less than 3, the adsorption efficiency drops significantly. Therefore, the development of a new solid adsorbent with high acid and radiation resistances is of critical importance for the extraction of uranium from spent fuel.

SUMMARY OF THE INVENTION

To solve the above technical problems, an object of the present invention is to provide a ligand-containing conjugated microporous polymer and use thereof. The ligand-containing conjugated microporous polymer of the invention can adsorb the radioactive element uranium in strongly acidic and strong-radiation environments.

In one aspect, the present invention provides a ligand-containing conjugated microporous polymer, which is obtained by covalent coupling of a conjugated microporous polymer and a uranium complexing ligand. The conjugated microporous polymer comprises an aromatic ring and/or a heterocyclic ring, and the uranium complexing ligand is selected from a compound with a group containing phosphorus, a compound with a group containing nitrogen, and a compound with a group containing sulfur and any combination thereof.

From the perspective of the structure, a polymer containing an aromatic ring structure has a good radiation resistance due to the presence of a π bond on the benzene ring that allows the radiant energy received by individual electrons to be allocated to all the electrons on the π bond, thereby reducing the chain breakage of the C—C bond due to excitation. The fully conjugated structure of the conjugated microporous polymer as a backbone can greatly dissipate the radiant energy, and effectively protect the ligand from decomposition or degeneration caused by irradiation. The designability of the polymer structure provides a variety of routes and methods for modifying the uranium ligands, and facilitates the modification of one or more uranium complexing ligands on the backbone. Moreover, considering the use under strongly acidic conditions, the uranium complexing ligand needs to have a high chemical stability and be able to effectively complex uranium in the presence of a strong acid. The uranium complexing ligand of the invention can be used in the presence of a strong acid and covalently attached to a polymer backbone through monomer attachment or post-modification, for adsorbing uranium in strongly acidic and strong-radiation environments.

Preferably, the conjugated microporous polymer is obtained by copolymerization of a first monomer and a second monomer. The first monomer and the second monomer are independently selected from benzene, a benzene derivative, fluorene, a fluorene derivative, porphyrin, a porphyrin derivative, pyridine, a pyridine derivative, thiophene, and a thiophene derivative. The first monomer and the second monomer are a binary, ternary, or tetranary compound comprising an aromatic ring and/or a heterocyclic ring, and the conjugated microporous polymer can be formed only by the copolymerization of the first monomer and the second monomer.

Preferably, the group containing phosphorus is selected from a phosphonic acid group, a phosphate ester group, a phosphonooxy group and any combination thereof.

Preferably, the group containing nitrogen is an amido group and/or a propanediamido group.

Preferably, the uranium complexing ligand comprises one or more of the following groups:

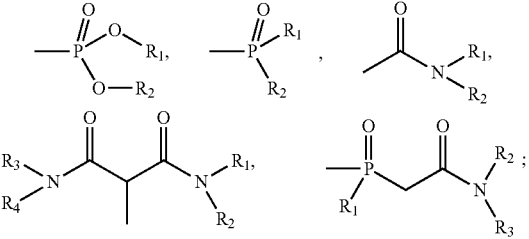

wherein $R_1$, $R_2$, $R_3$ and $R_4$ are independently selected from alkyl, hydrogen, phenyl and a heterocyclic group.

Preferably, the compound with a group containing phosphorus has a structure of

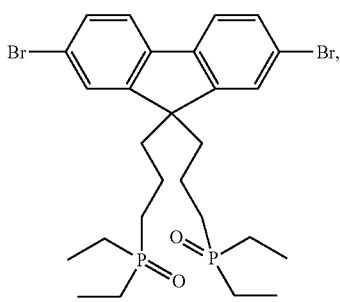 [SMILES: CCP(=O)(CC)CCCC1(CCCP(=O)(CC)CC)c2cc(Br)ccc2-c2ccc(Br)cc21]

P(OCH$_3$)$_3$, or

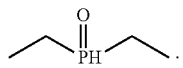

Preferably, a compound with a group containing nitrogen has a structure of

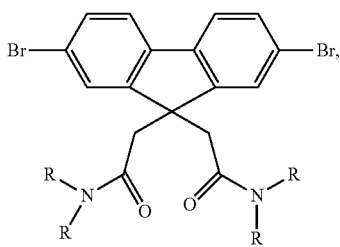

wherein R is CH$_2$CH$_3$, CH$_2$CH$_2$CH$_3$ or phenyl.

Preferably, the ligand-containing conjugated microporous polymer is synthesized by the step of:

copolymerizing the first monomer and the second monomer, and then reacting with the uranium complexing ligand compound, to obtain the ligand-containing conjugated microporous polymer, wherein the uranium complexing ligand compound is phosphonic acid, a phosphate ester, a phosphonooxy compound, an amide, or a propanediamide compound.

Preferably, the ligand-containing conjugated microporous polymer is synthesized by the step of:

reacting the first monomer with the uranium complexing ligand compound, and then copolymerizing with the second monomer, to obtain the ligand-containing conjugated microporous polymer, wherein the uranium complexing ligand compound is phosphonic acid, a phosphate ester, a phosphonooxy compound, an amide, or a propanediamide compound.

Preferably, when the uranium complexing ligand compound is a phosphate ester, the ligand-containing conjugated microporous polymer is synthesized by the steps of:

reacting 1,3,5-tribromobenzene, bis(pinacolato)diboron, and potassium acetate at 100° C. with stirring in the presence of a catalyst, to obtain a first product; reacting 2,7-dibromofluorene and tetrabutylammonium bromide at room temperature in the presence of a base, to obtain a second product; and reacting the first product and the second product at 90° C. for 24 hrs and then at 120° C. for 72 hrs in the presence of a catalyst, to obtain the ligand-containing conjugated microporous polymer, wherein the catalyst is tetrakis(triphenylphosphine)palladium (Pd(PPh$_3$)$_4$).

Preferably, when the uranium complexing ligand compound is an amide, the ligand-containing conjugated microporous polymer is synthesized by the step of:

reacting 2,7-dibromofluorene with ethyl bromoacetate at room temperature with stirring in the presence of a base, to obtain a third product; and reacting the first product with the third product at 90° C. for 24 hrs and then at 120° C. for 72 hrs in the presence of a base and a catalyst, to obtain the ligand-containing conjugated microporous polymer, wherein the catalyst is Pd(PPh$_3$)$_4$.

Preferably, when the uranium complexing ligand compound is phosphonic acid, the ligand-containing conjugated microporous polymer is synthesized by the step of:

mixing 2,2'-bipyridine, bis(1,5-cyclooctadiene)nickel, and 1,5-cyclooctadiene uniformly, adding the first product and the third product, and performing reaction at room temperature, to obtain a fourth product; mixing the fourth product, paraformaldehyde, hydrochloric acid, phosphonic acid, and acetic acid uniformly, and performing reaction at 90° C., to obtain a fifth product; mixing the fifth product and triethyl phosphite uniformly, and performing reaction for 24 hrs under reflux, to obtain a sixth product; and reacting the sixth product in an acid under reflux. After the reaction, the reaction solution is cooled to room temperature, and the precipitate is collected, washed thrice with THF, methanol, and water, and then dried under vacuum, to obtain the ligand-containing conjugated microporous polymer.

Preferably, when the uranium complexing ligand compound is a phosphonooxy compound, the ligand-containing conjugated microporous polymer is synthesized by the step of:

mixing 2,7-dibromofluorene and tetrabutylammonium bromide in a base and allyl bromide, and performing reaction at room temperature, to obtain a seventh product; reacting 1,3,5-trialkynylbenzene with the seventh product at 90° C. in the presence of tetrakis(triphenylphosphine)palladium, CuI, and triethyl amine, to obtain an eighth product; and reacting the eighth product and a phosphonooxy compound at 125° C. in the presence of an initiator, to obtain a ligand-containing conjugated microporous polymer.

In another aspect, the invention provides use of the ligand-containing conjugated microporous polymer as a uranium adsorbent.

Preferably, the adsorbent is used in strongly acidic and strong-radiation environments.

Preferably, the concentration of the strong acid is 4-6 mol/L, and the radiation intensity is 200-1,000 KGy.

Preferably, the strong acid is nitric acid, and the radiation is generated with γ ray.

Preferably, the adsorbent is used at 25-45° C. to adsorb or separate uranium.

In the compound of the present invention, a uranium complexing ligand with high chemical stability is incorporated. By using the compound of the invention, uranium can be effectively extracted from a high concentration of nitric acid solution into an organic layer by liquid-liquid extraction. The conjugated structure can greatly dissipate the radiant energy and effectively protect the ligand from degradation or degeneration caused by irradiation.

By means of the above technical solutions, the invention has the following advantages.

In the present invention, a conjugated microporous polymer is used as a backbone, and the adsorption and separation of uranium in strongly acidic and strong-radiation environments is realized by using the characteristic of the conjugated microporous polymer that it can effectively dissipate the radiant energy, in combination with a functionalized ligand (a uranium complexing ligand).

DETAILED DESCRIPTION OF THE PREFERRED EMBODIMENTS

Figure 1:
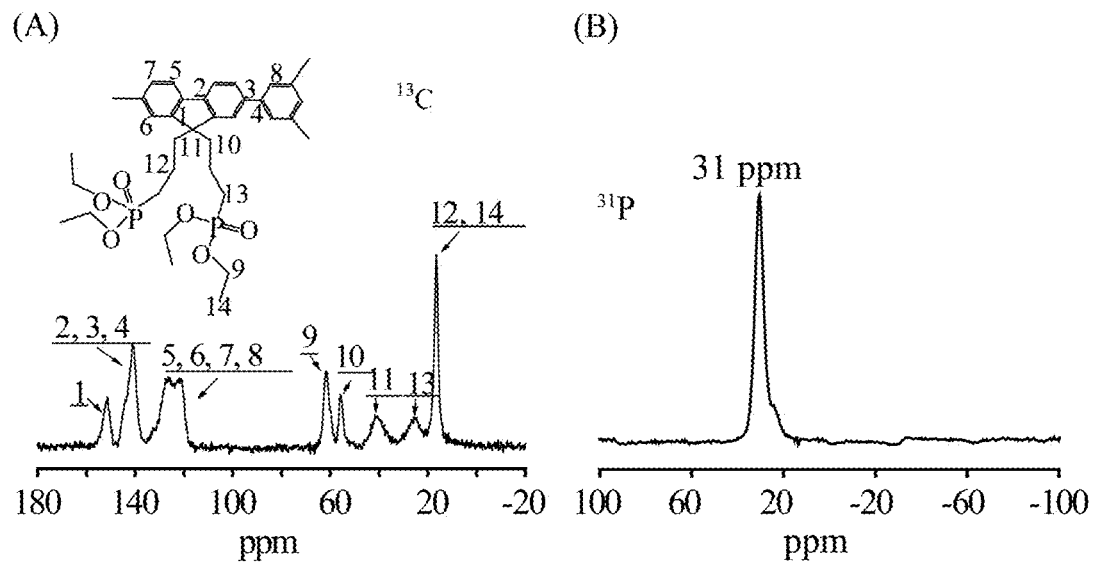
FIG. 1 shows a Solid-State NMR (SSNMR) spectrum of a ligand-containing conjugated microporous polymer according to embodiment 1 of the invention.

The invention will be further illustrated in more detail with reference to the accompanying drawings and embodiments. It is noted that, the following embodiments only are intended for purposes of illustration, but are not intended to limit the scope of the present invention.

Embodiment 1

Preparation of a Conjugated Microporous Polymer Containing a Phosphate Ester Ligand In this example, the synthesis of a conjugated microporous polymer modified with a phosphate ligand is exemplarily described. The process is specifically as follows.

To a mixture of 1,3,5-tribromobenzene (790 mg), potassium acetate (1.47 g), and bis(pinacolato)diboron (2.285 g), DMF (20 ml) was added, and $N_2$ was bubbled therethrough for 20 min. The catalyst tetrakis(triphenylphosphine)palladium ($Pd(PPh_3)_4$, 89 mg) was added, to obtain a mixed solution. The mixed solution was reacted at 100° C. for 24 hrs with stirring, and then cooled to room temperature. Then, the reaction solution was extracted with dichloromethane and water. The organic layer was washed thrice with water, dried over anhydrous sodium sulfate, and then purified by chromatography on silica gel (eluant: 10% EtOAc/petroleum ether), to obtain the monomer TDB as a white solid. The reaction route for the above reaction is shown below:

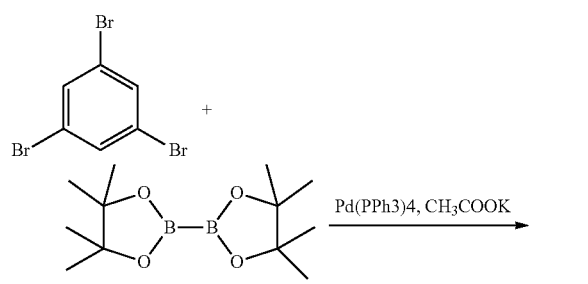

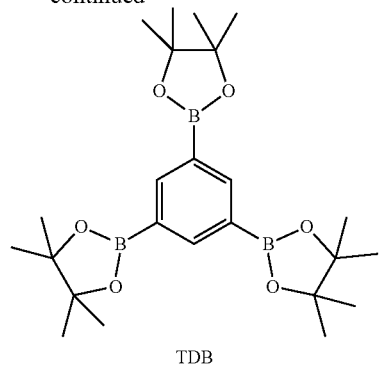

TDB (2) Potassium hydroxide (50 g) was dissolved in water (50 ml), and then 2, 7-dibromofluorene (1.23 g) and tetrabutylammonium bromide (370 mg) were added, followed by 1,3-dibromopropane (5 ml). The mixture was reacted for 25 min at room temperature with stirring under nitrogen atmosphere, and then extracted twice with dichloromethane. The organic layer was washed with water and then with 1 M HCl and saturated saline, and finally dried over anhydrous magnesium sulfate. After the solvent was removed, the residue was purified by chromatography on silica gel (eluant: 5% $CH_2Cl_2$/n-hexane) to obtain F-1 as a white solid. F-1 (250 mg) was dispersed in triethyl phosphite (3 ml), and refluxed at 170° C. for 4 hrs under nitrogen atmosphere. Excessive triethyl phosphite was evaporated under reduced pressure, and the resulting solid was purified by chromatography on silica gel (4% EtOH/$CH_2Cl_2$) to obtain the monomer F2. $^1$H NMR ($CDCl_3$, 400 MHz), δ 7.47 (6H, m), 3.92 (8H, m), 1.47 (4H, m), 1.17 (12H, t, J=7.0 Hz), 0.85 (4H, m). The reaction route for the above reactions was shown as below:

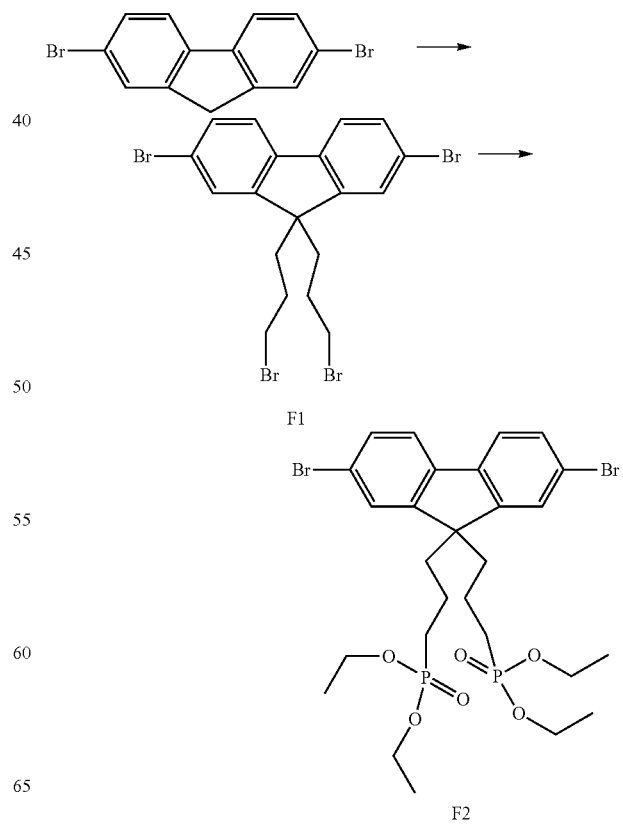

Figure 2:
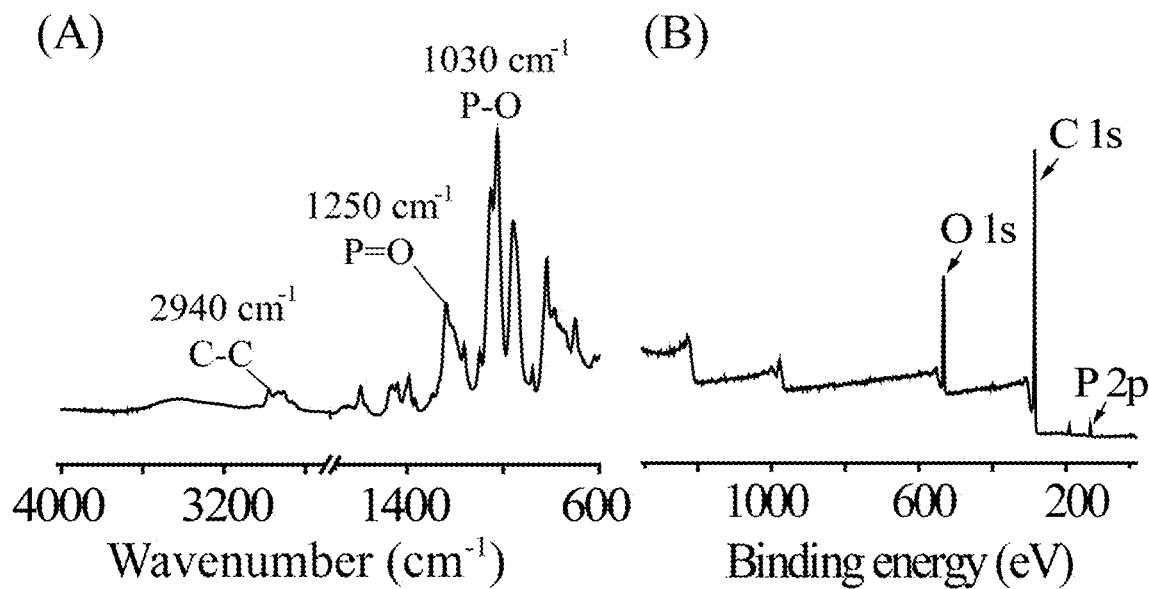
FIG. 2 shows an IR spectrum and an X-ray photoelectron spectrum of the ligand-containing conjugated microporous polymer according to embodiment 1 of the invention.

(3) TDB (131.8 mg) and F2 (295 mg) were dissolved in DMF (50 ml), and nitrogen was bubbled therethrough for 30 min. A Na$_2$CO$_3$ solution (5 ml, 1 M) was added, and then the catalyst tetrakis(triphenylphosphine)palladium (Pd(PPh$_3$)$_4$, 25 mg) was added. Under nitrogen atmosphere, the mixture was reacted at 90° C. for 24 hrs with stirring and then at 120° C. for 72 hrs with stirring. Then, the reaction solution was cooled, washed thrice respectively with DMF and dichloromethane, dialyzed against water, and then lyophilized, to obtain a ligand-containing conjugated microporous polymer (hereafter referred to as CMP-EP). The reaction route for the above reaction is shown below:

The physical and chemical properties of the synthesized CMP-EP were characterized by Solid-State NMR (SS-NMR), IR spectroscopy, and X-ray photoelectron spectroscopy (XPS). The results are shown in FIGS. 1-2. FIG. 1(A) is a $^{13}$C Solid-State NMR spectrum of CMP-EP, and FIG. 1(B) is a $^{31}$P Solid-State NMR spectrum of CMP-EP. As can be seen from FIG. 1, a corresponding peak can be found on the $^{13}$C Solid-State NMR spectrum for each carbon atom of the product CMP-EP, and a peak corresponding to the phosphorous in the phosphate ester group can also be found on the $^{31}$P Solid-State NMR spectrum of CMP-EP. FIG.

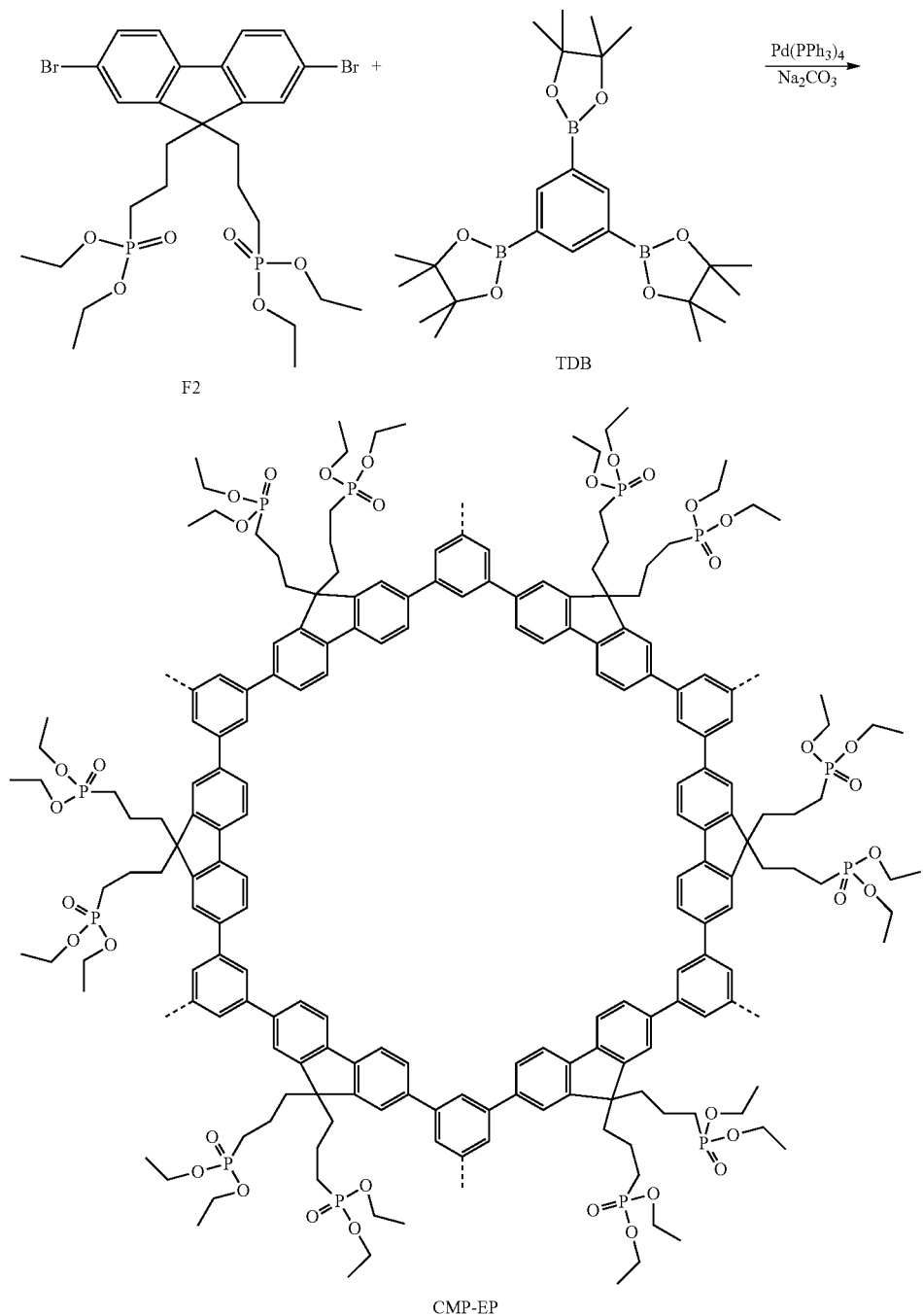

2(A) is an IR spectrum of CMP-EP, and FIG. 2(B) is an X-ray photoelectron spectrum of CMP-EP. In FIG. 2(A), a C—C stretching vibration peak occurs at 2940 cm$^{-1}$; and stretching vibration peaks corresponding to a phosphorus-oxygen double bond and a phosphorus-oxygen single bond in the phosphate ester group occur respectively at 1250 cm$^{-1}$ and 1030 cm$^{-1}$. In FIG. 2(B), besides the peaks attributing to O 1s and C 1s, a peak corresponding to P 2p is additionally observed at 133.2 eV. The above results indicate that a conjugated microporous polymer CMP-EP modified with a phosphate ester can be successfully obtained by the above method.

Embodiment 2

Figure 3:
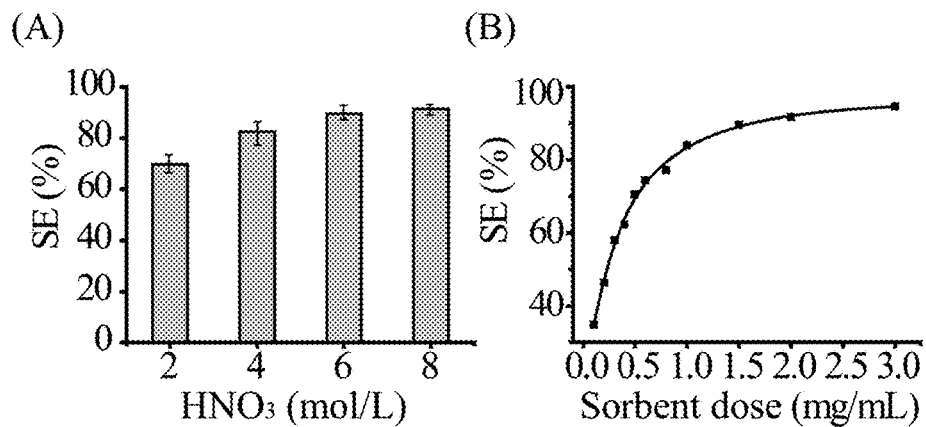
FIG. 3 shows the effect of different conditions on the adsorption efficiency of the adsorbent according to embodiment 2 of the invention.

Adsorption for Uranium in a Strongly Acidic Environment (1) CMP-EP (1 mg) prepared in embodiment 1 was weighed and dispersed in uranyl solutions with various concentrations of nitric acid. The adsorbent was removed by filtration after adsorption equilibrium was reached at 25° C. The uranium content in the solution was detected by ICP-MS, and the adsorption efficiency was calculated. Various weights of CMP-EP were weighed and dispersed in a uranyl solution containing 6 M HNO$_3$. The adsorbent was removed by filtration after adsorption equilibrium was reached. The uranium content in the solution was detected. The results are shown in FIG. 3. FIG. 3(A) illustrates the effect of nitric acid concentration on the adsorption efficiency, and FIG. 3(B) illustrates the effect of the amount of the adsorbent CMP-EP on the adsorption efficiency. FIG. 3 shows that the conjugated microporous polymer modified with a phosphate ester prepared in the invention has an excellent adsorption performance in the acidity range of spent fuel (4-6M HNO$_3$), with the adsorption efficiency reaching about 90%. With the increase of the amount of the adsorbent used, the adsorption efficiency is increased accordingly.

Figure 4:
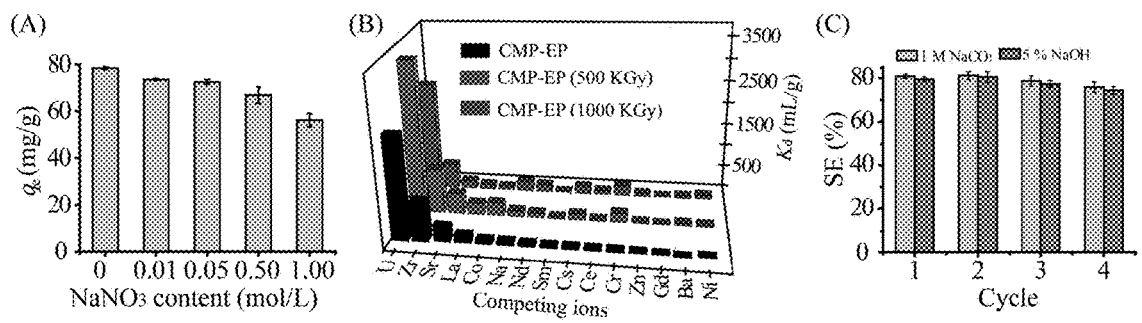
FIG. 4 illustrates the effect of different salt concentrations on the adsorption capacity of the adsorbent according to embodiment 2 of the invention; the $K_d$ value of CMP-EP for U (VI) and competing metal ions before irradiation, after irradiation of 500 kGy in 6 M $HNO_3$ and after irradiation of 1,000 kGy in 6 M $HNO_3$; The reusability of CMP-EP.
Figure 5:
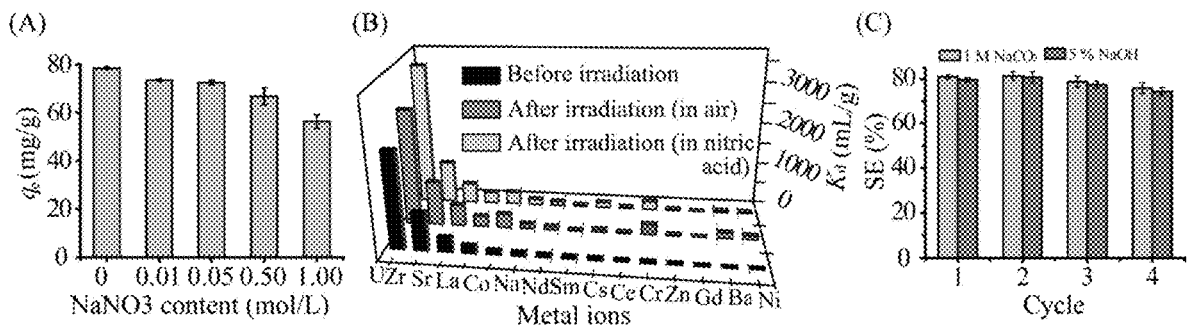
FIG. 5 illustrates the effect of different salt concentrations on the adsorption capacity of the adsorbent according to embodiment 2 of the invention; the $K_d$ value of CMP-EP for U (VI) and competing metal ions before irradiation, after irradiation of 500 kGy in air and after irradiation of 500 kGy in 6 M $HNO_3$; The reusability of CMP-EP.

(2) CMP-EP prepared in embodiment 1 was dispersed in uranyl solutions with various concentrations of sodium nitrate. The adsorbent was removed by filtration after adsorption equilibrium was reached. The uranium content in the solution was detected. FIGS. 4(A), 5(A) illustrate the effect of different salt concentrations on the adsorption capacity of the adsorbent. The results show that the metal salt does not affect the adsorption performance of the adsorbent, and the concentration of the metal salt has little effect on the adsorption performance of the adsorbent.

(3) A mixed ion solution containing the elements U, Zr, Sr, La, Co, Na, Nd, Sm, Cs, Ce, Cr, Zn, Gd, Ba, and Ni (in which the concentration of each ion was about 100 ppm) was formulated by simulating the acidity environment of and the ion species in spent fuel.

A certain weight of CMP-EP was weighed and dispersed in the above mixed ion solution (where the concentration of the adsorbent was 1 mg/mL in the mixed solution). The adsorbent was removed by filtration after adsorption equilibrium was reached (in about 2 hrs). The concentration of each ion in the solution was detected. FIG. 4(B) shows the partition coefficients $K_d$ of CMP-EP for various ions. The results show that the partition coefficient of CMP-EP for uranium is as high as 2375 mL/g, which is much larger than the partition coefficients for other metal ions, and this suggests that CMP-EP can selectively separate and adsorb uranium in a strongly acidic solution with various ions.

(4) Moreover, the recyclability of the material was also investigated. CMP-EP (20 mg) was weighed and dispersed in a uranyl solution containing nitric acid (where in the mixed solution, the concentration of the adsorbent was 1 mg/mL, the concentration of uranyl was 0.04 mmol/L, and the concentration of nitric acid was 6 mol/L). After adsorption equilibrium was reached, the mixed solution was centrifuged (at 4000 rpm for 20 min) to separate the CMP-EP after adsorption. The supernatant was diluted and detected for the adsorption efficiency by ICP-MS. The adsorbent was washed with water three times, added with an eluant (20 mL) (5% NaOH solution or 1 mol/L Na$_2$CO$_3$ solution), and stirred overnight. The sample was separated by centrifugation, washed to neutrality with water, and then a uranyl solution was added to for a second adsorption. The above process was repeated 4 times. The result is shown in FIG. 4(C). The recyclability test shows that CMP-EP can effectively maintain the high adsorption efficiency of the adsorbent for uranium after being eluted with a alkaline eluant, and this confirms that the material has excellent recycling performance.

Embodiment 3

Adsorption for Uranium in a Strong-Radiation Environment

Figure 6:
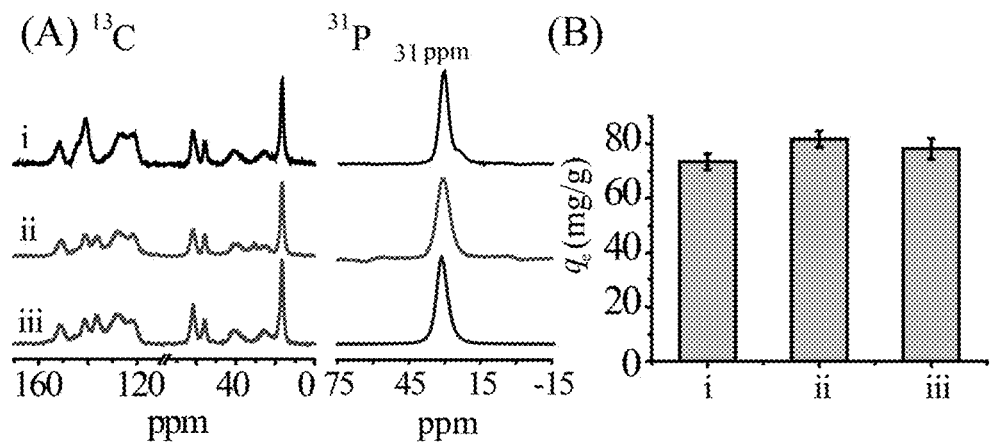
FIG. 6 shows Solid-State NMR spectra and the adsorption capacities of the adsorbent before irradiation, after irradiation of 500 kGy in 6 M $HNO_3$ and after irradiation of 1,000 kGy in 6 M $HNO_3$ according to embodiment 3.
Figure 7:
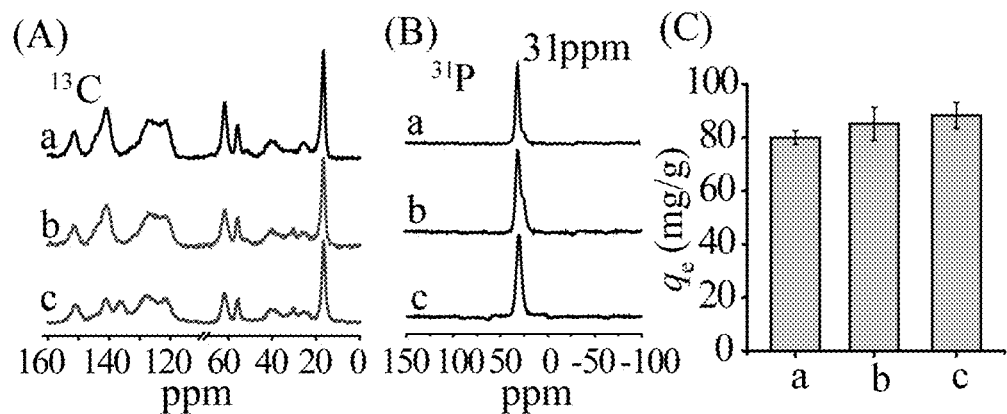
FIG. 7 shows Solid-State NMR spectra and the adsorption capacities of the adsorbent before irradiation, after irradiation of 500 kGy in air and after irradiation of 500 kGy in 6 M $HNO_3$ according to embodiment 3.

CMP-EP prepared in embodiment 1 was irradiated by γ ray of 500 KGy in air. Also, CMP-EP prepared in embodiment 1 was dispersed in a 6 M nitric acid solution and irradiated by γ ray of 500 KGy and 1,000 KGy. After irradiation, the radiation resistance of CMP-EP was investigated by solid-state NMR and adsorption experiment as follows. The irradiated CMP-EP was added to a uranyl solution, and the adsorbent was removed by filtration after adsorption equilibrium was reached at 25° C. The adsorption capacity was determined. The results are shown in FIGS. 6-7. FIGS. 6(A), 7(A) show $^{13}$C Solid-State NMR spectra of CMP-EP before and after irradiation; FIGS. 6(B), 7(B) show $^{31}$P Solid-State NMR spectra of CMP-EP before and after irradiation; and FIGS. 6(C),7(C)shows the adsorption capacities of CMP-EP before and after irradiation. It can be found, by comparison of the Solid-State NMR spectra, the adsorption capacities and the selectivity (FIGS. 4 (B), 5 (B),) of the material before and after irradiation, that CMP-EP has excellent radiation resistance, and the adsorption performance does not change significantly after γ ray irradiation of 1,000 KGy.

Embodiment 4

Synthesis of a Conjugated Microporous Polymer CMP-N Containing an Amide Ligand

A conjugated microporous polymer CMP-N was obtained by Suzuki coupling polymerization with an amide as a ligand.

(1) Synthesis of Monomer F3

2, 7-dibromofluorene (3.3 g, 10 mmol) was dispersed in a mixed solution of a 50% aqueous NaOH solution (8 mL) and DMSO (80 mL), and a solution of ethyl bromoacetate (5 g, 30 mmol) in DMSO (10 mL) was added dropwise at 0° C. After addition, the mixed solution was stirred for 12 hrs at room temperature. After the reaction was completed, a 10 N HCl solution (18 ml) was added in an ice bath, and the resulting solution was stirred for 30 min. The precipitate was collected, washed with water three times, and then dried under vacuum. The precipitate was recrystallized in ethanol and dichloromethane, to obtain F3 as a white crystalline solid. The reaction route is shown as below, where R=CH$_2$CH$_3$, CH$_2$CH$_2$CH$_3$, or phenyl:

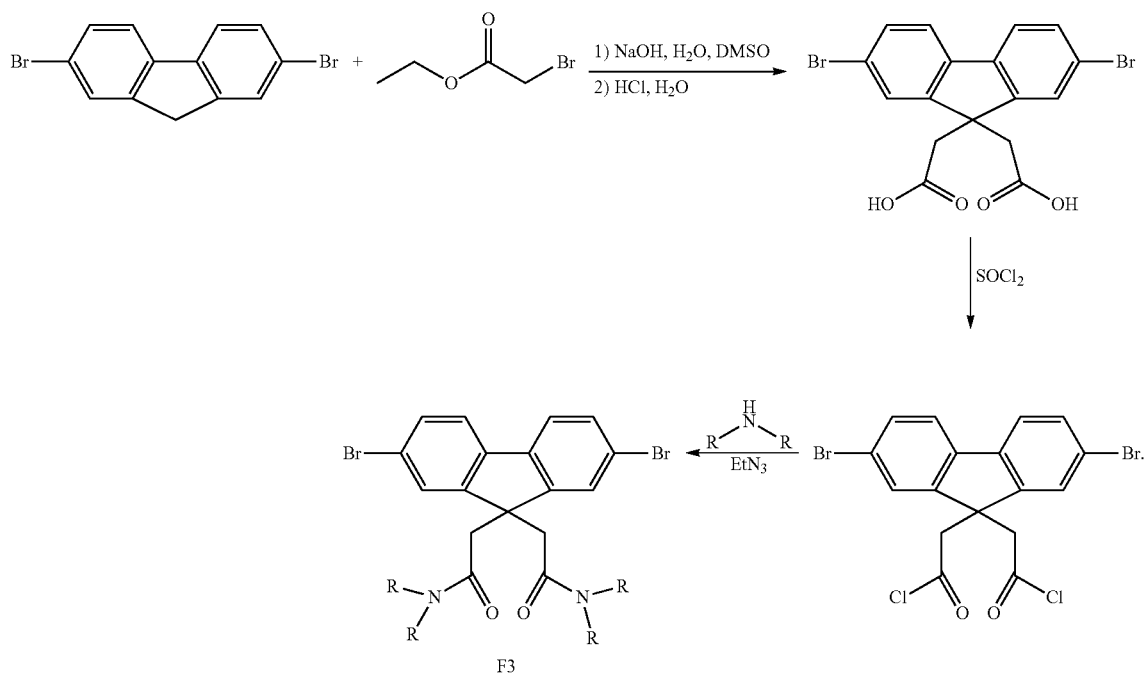

(2) Synthesis of CMP-N

TDB (1 eq) prepared in embodiment 1 and F3 (1.5 eq) were dissolved in DMF (50 ml). Nitrogen was bubbled therethrough for 30 min, and 1 M Na$_2$CO$_3$ solution (5 ml) and tetrakis(triphenylphosphine)palladium (Pd(PPh$_3$)$_4$, 3% based on the mole number of the monomer) were added. Under nitrogen atmosphere, the mixture was reacted at 90° C. for 24 hrs with stirring, and then at 120° C. for 72 hrs with stirring. After cooling, the resulting product was washed respectively with DMF (3×) and dichloromethane (3×), dialyzed against water and then freeze-dried, to obtain a ligand-containing conjugated microporous polymer CMP-N. The reaction route is shown as below:

TDB + F3 $\xrightarrow{\text{Pd(PPh}_3)_4}{\text{Na}_2\text{CO}_3}$

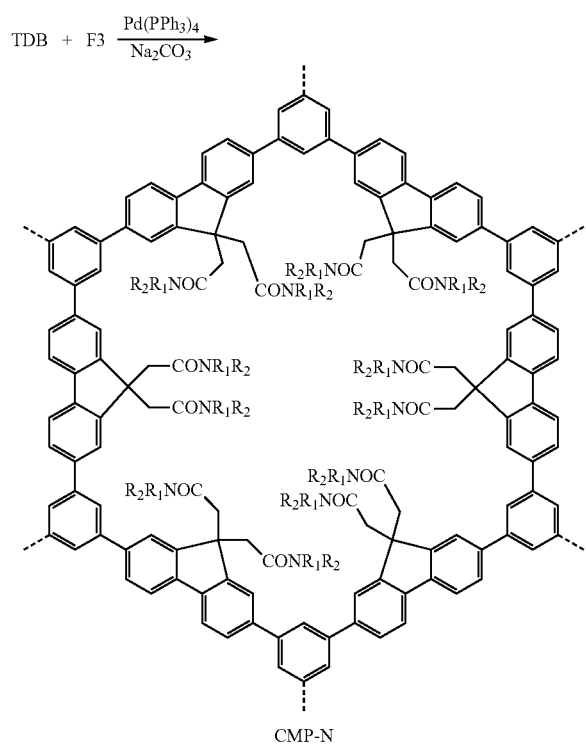

CMP-N

Embodiment 5

Synthesis of a Conjugated Microporous Polymer CMP-CP Containing a Phosphonic Acid Ligand By Post-Modification A conjugated microporous polymer CMP-CP containing a phosphonic acid ligand was synthesized by post-modification. A reaction route was shown as below.

(1) Synthesis of CMP-C 2,2'-bipyridine (1 eq), bis(1,5-cyclooctadiene)nickel [Ni(COD)$_2$, 1 eq], and 1,5-cyclooctadiene (COD, 1 eq) were dissolved in a mixed solvent of anhydrous THF and 1,4-dioxane, and then TDB and F3 were added. The resulting solution was stirred overnight at room temperature under nitrogen atmosphere. After reaction, a 6 M HCl solution was added dropwise to the solution in an ice bath and stirring is performed for 6 hrs. The precipitate was collected by filtration, washed sequentially with chloroform, THF, methanol, and water, and dried under vacuum to obtain CMP-C.

(2) Synthesis of CMP-CC1

CMP-C (200 mg), paraformaldehyde (0.5 g), hydrochloric acid (37%, 10 ml), phosphonic acid (85%, 2 ml), and acetic acid (3 ml) were sequentially added to an ampoule, sealed, and reacted at 90° C. for three days. After reaction, the precipitate was collected by filtration, washed three times with water and methanol, and then dried under vacuum to obtain CMP-CC1.

(3) Synthesis of CMP-CEP

CMP-CC1 (200 mg) was weighed and dispersed in triethyl phosphite (10 ml). The resulting suspension was refluxed for 24 hrs under nitrogen atmosphere. After reaction, the resulting mixture was cooled to room temperature. The precipitate was collected, washed three times with THF, methanol, and water, and then dried under vacuum, to obtain CMP-CEP.

(4) Synthesis of CMP-CP

CMP-CEP (200 mg) was weighed and dispersed in water (100 g) and concentrated hydrochloric acid (20 ml). The resulting suspension was refluxed for two days under nitrogen atmosphere. The precipitate was collected, washed to neutrality with water, then washed three times with methanol, and dried under vacuum to obtain CMP-CP.

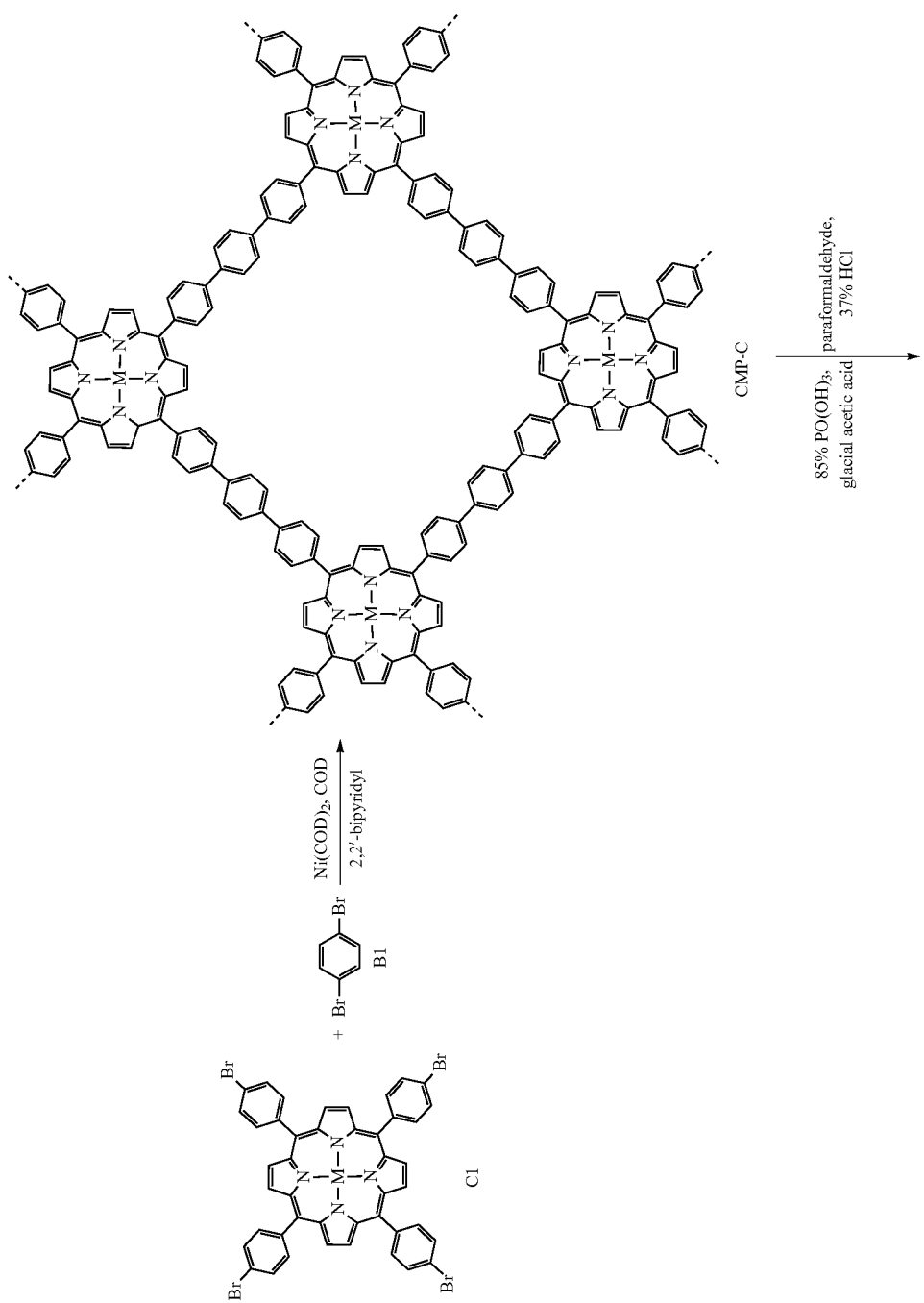

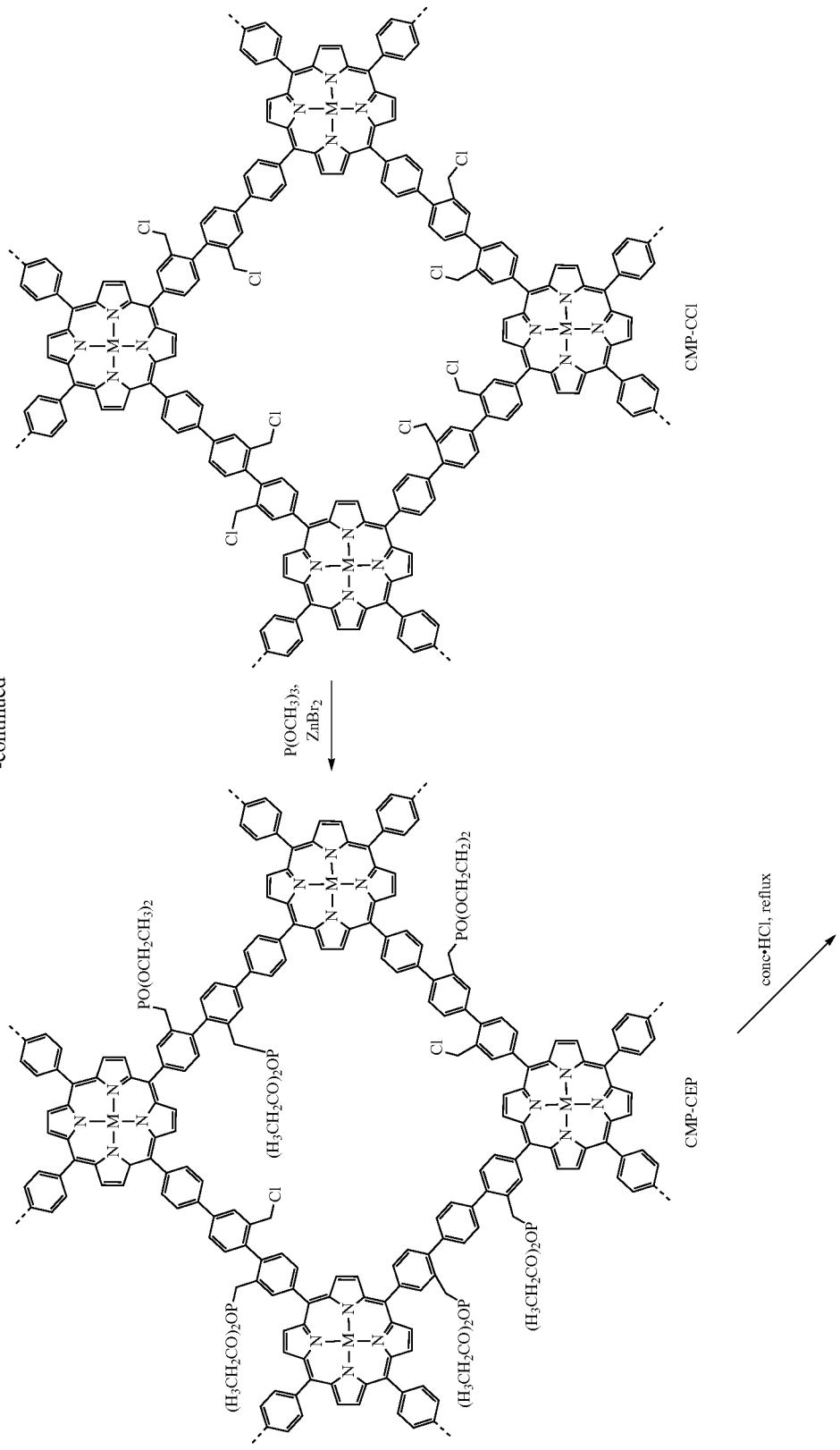

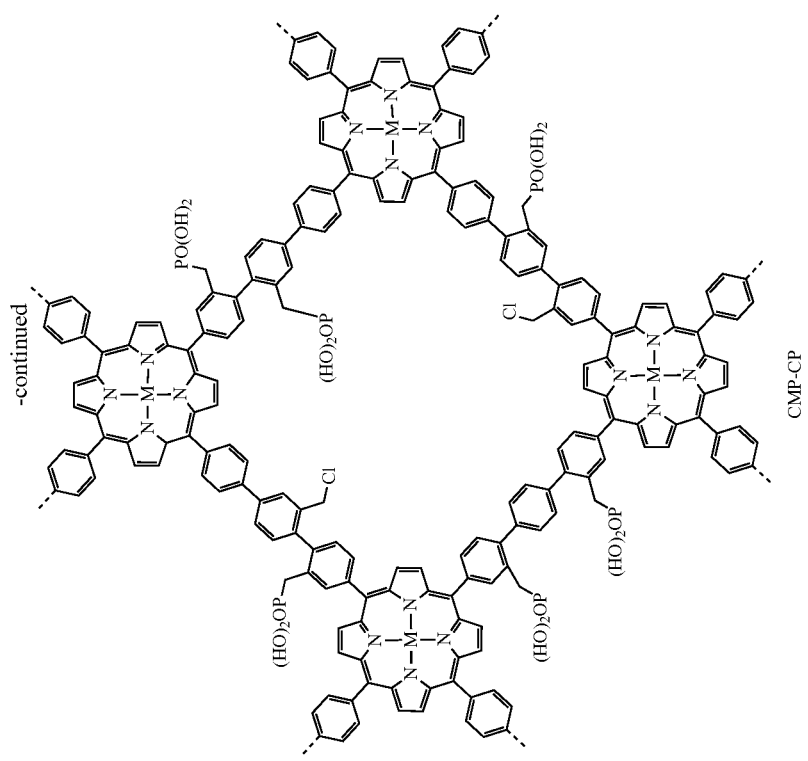

Embodiment 6
Synthesis of a Conjugated Microporous Polymer CMP-P Containing a Phosphonooxy Compound as a Ligand
A conjugated microporous polymer CMP-P containing a phosphonooxy compound as a ligand was synthesized. A specific reaction route was shown as below.
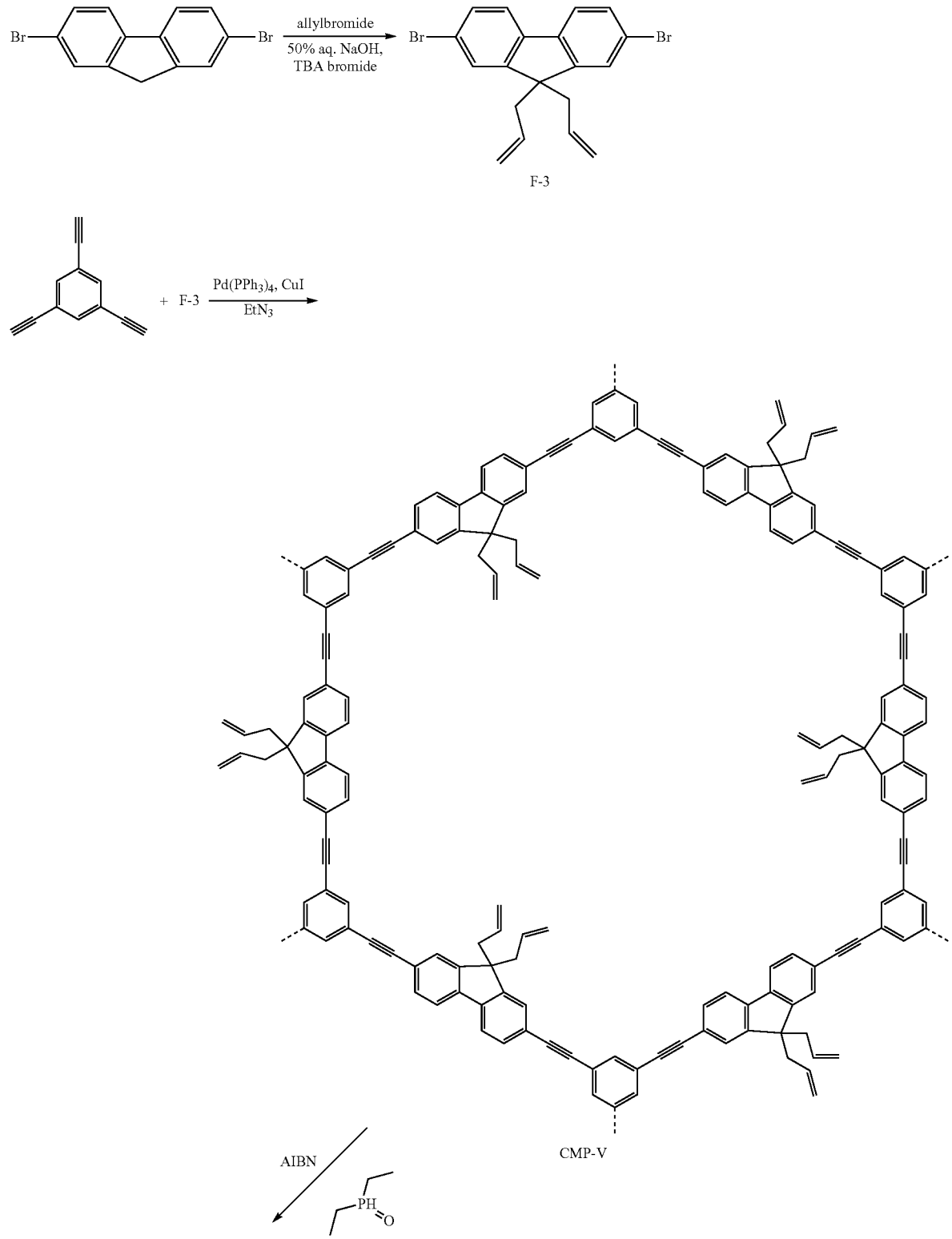

-continued

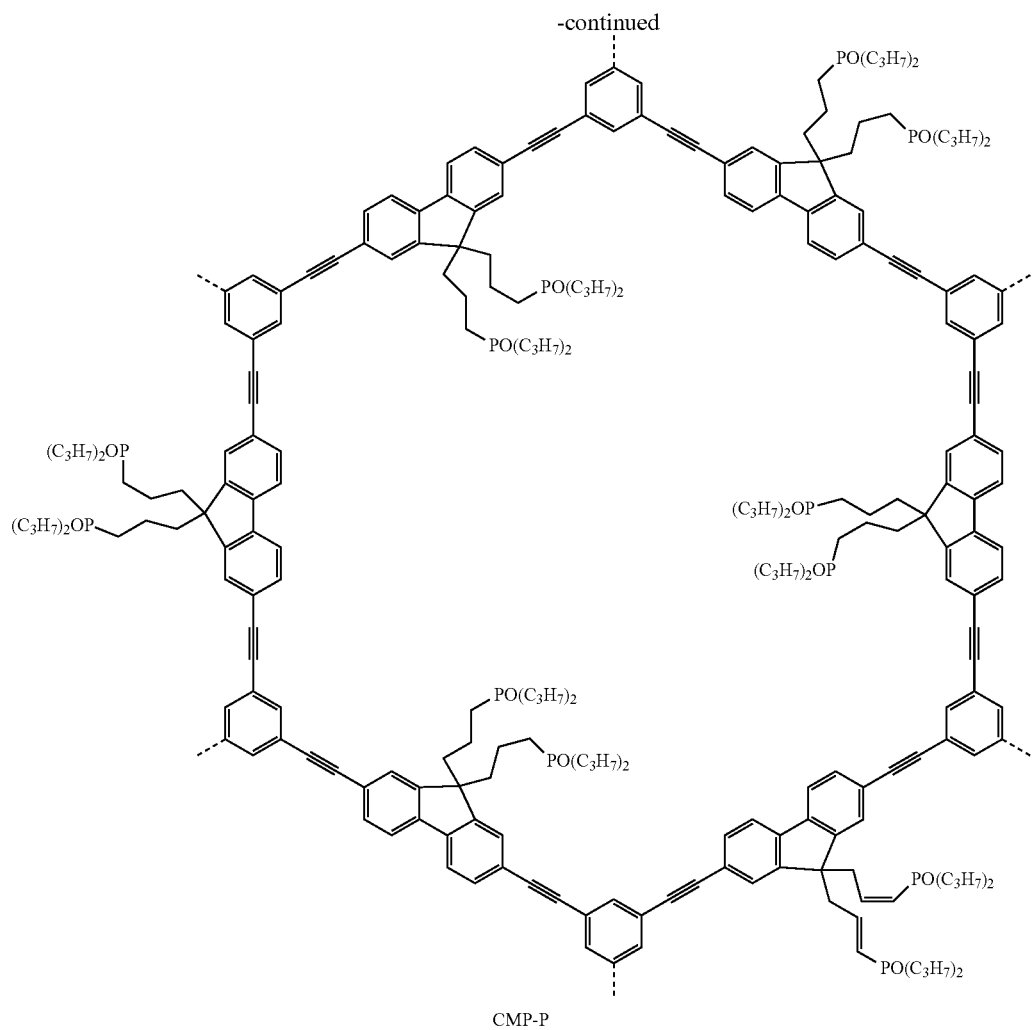

CMP-P

In this example, a conjugated polymer backbone was synthesized firstly, and then a phosphonooxy compound ligand was attached by post-modification.

(1) Synthesis of F-3

2,7-dibromofluorene (1 eq) and tetrabutylammonium bromide (2 eq) were added to a mixed solution of DMSO (15 ml), 50% (w/w) NaOH (15 ml) and allyl bromide (10 eq) that was degassed with argon, and the resulting solution was stirred for two hours at room temperature under argon atmosphere. After reaction, tert-butyl methyl ether (125 ml) and deionized water (50 ml) were added, and stirred for 15 min. The organic layer was separated, and the solvent was removed by rotary evaporation, and then the resulting product was purified by chromatography on silica gel (eluting with cyclohexane). The solid was recrystallized in chloroform to give the monomer F-3.

(2) Synthesis of CMP-V 1,3,5-trialkynylbenzene (1 eq), F-3 (1.5 eq), CuI (10% based on the mole number of F-3) and tetrakis(triphenylphosphine)palladium (5% based on the mole number of F-3) were placed to a two-neck flask, and then DMF (10 ml) and triethyl amine (10 ml) were added. The resulting solution was stirred at 90° C. for 24 hrs under nitrogen atmosphere. After reaction, the reaction solution was cooled to room temperature. The precipitate was collected and washed three times with chloroform, methanol and acetone, rinsed with methanol in a Soxhlet extractor for three days, and then dried under vacuum to give CMP-V.

(3) Synthesis of CMP-P

CMP-V (200 mg) was weighed and dispersed in anhydrous toluene (20 ml), and AIBN (20 mg) and $R_2PH(O)$ (0.05 mol) were added, the resulting solution was stirred at 125° C. for 12 hrs under argon atmosphere. After reaction, the reaction solution was cooled to room temperature. The precipitate was collected, washed three times with ethanol and water, and then dried under vacuum, to obtain CMP-P. The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

What is claimed is:

1. A ligand-containing conjugated microporous polymer, obtained by covalent coupling of a conjugated microporous polymer and a uranium complexing ligand, wherein the conjugated microporous polymer comprises an aromatic ring and/or a heterocyclic ring, and the uranium complexing ligand is selected from a compound with a group containing phosphorus, a compound with a group containing nitrogen, a compound with a group containing sulfur and any combination thereof, wherein the uranium complexing ligand comprises one or more of the following groups:

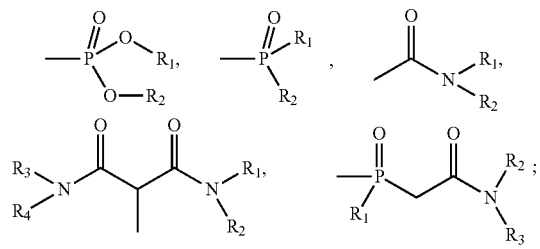

wherein $R_1$, $R_2$, $R_3$ and $R_4$ are independently selected from alkyl, hydrogen, phenyl and a heterocyclic group.

2. The ligand-containing conjugated microporous polymer as claimed in claim 1, wherein the conjugated microporous polymer is obtained by copolymerization of a first monomer and a second monomer, the first monomer and the second monomer being independently selected from the group consisting of benzene, a benzene derivative, fluorene, a fluorene derivative, porphyrin, a porphyrin derivative, pyridine, a pyridine derivative, thiophene and a thiophene derivative.

3. The ligand-containing conjugated microporous polymer as claimed in claim 2, wherein the group containing phosphorus is selected from a phosphonic acid group, a phosphate ester group, a phosphonooxy group and any combination thereof.

4. The ligand-containing conjugated microporous polymer as claimed in claim 2, wherein the group containing nitrogen is an amido group and/or a propanediamido group.

5. The ligand-containing conjugated microporous polymer as claimed in claim 1, wherein the compound with a group containing phosphorus has a structure of

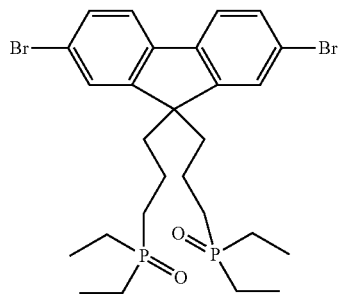 [SMILES: CCP(=O)(CC)CCCC1(CCCP(=O)(CC)CC)c2cc(Br)ccc2-c2ccc(Br)cc21]

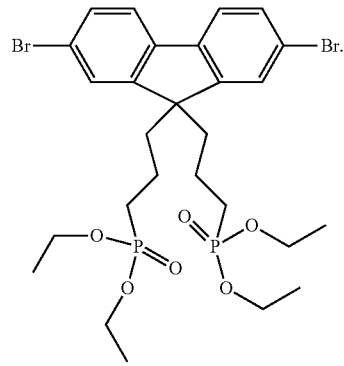 [SMILES: CCOP(=O)(CCCC1(CCCP(=O)(OCC)OCC)c2cc(Br)ccc2-c2ccc(Br)cc21)OCC]

6. The ligand-containing conjugated microporous polymer as claimed in claim 1, wherein the compound with a group containing nitrogen has a structure of

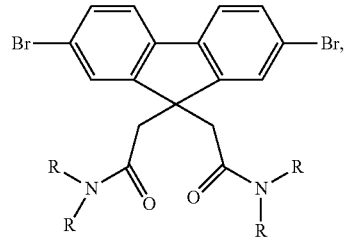

wherein R is $CH_2CH_3$, $CH_2CH_2CH_3$, or phenyl.

7. The ligand-containing conjugated microporous polymer as claimed in claim 2, wherein the polymer is synthesized by the step of:
copolymerizing the first monomer and the second monomer, and then reacting with the uranium complexing ligand compound, to obtain the ligand-containing conjugated microporous polymer, wherein the uranium complexing ligand compound is phosphonic acid, a phosphate ester, a phosphonooxy compound, an amide or a propanediamide compound.

8. The ligand-containing conjugated microporous polymer as claimed in claim 2, wherein the polymer is synthesized by the step of:
reacting the first monomer with the uranium complexing ligand compound, and then copolymerizing with the second monomer, to obtain the ligand-containing conjugated microporous polymer, wherein the uranium complexing ligand compound is phosphonic acid, a phosphate ester, a phosphonooxy compound, an amide or a propanediamide compound.

9. A uranium adsorbent comprising the ligand-containing conjugated microporous polymer as claimed in claim 1.

10. The uranium adsorbent as claimed in claim 9, wherein the adsorbent is used in acidic and radiation environments.

11. The uranium adsorbent as claimed in claim 10, wherein the acidic and radiation environments comprise an acid with a concentration of 4-6 mol/L and a radiation intensity of 200-1,000 KGy.

* * * * *